Oct. 6, 1959     L. C. SACKETT     2,907,948
SAFETY ENGINE ANALYZER SYNCHRONIZER
Filed Oct. 22, 1956
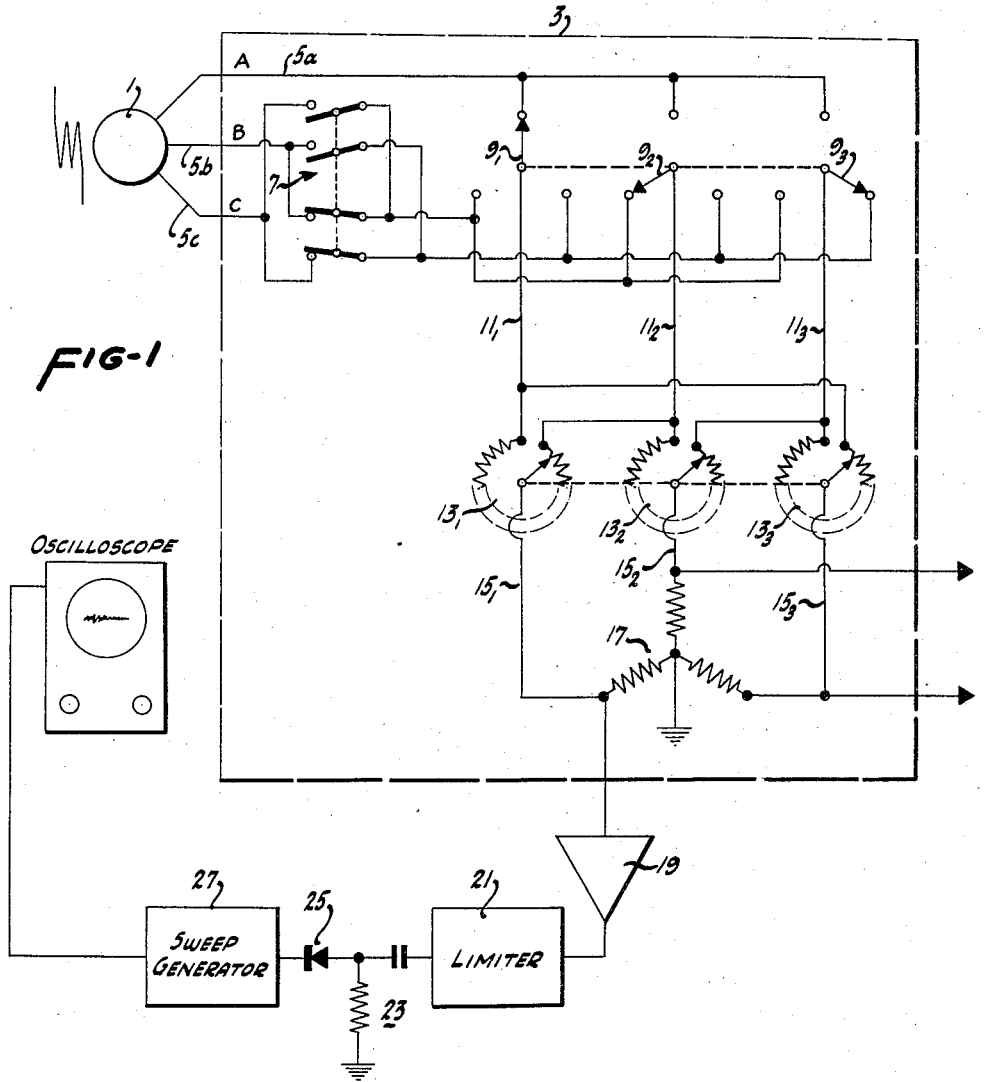
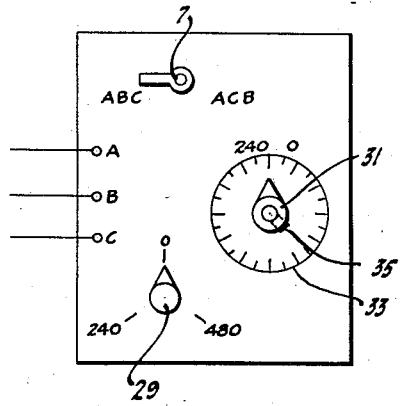
INVENTOR.
LOREN C. SACKETT
BY
ATTORNEYS

United States Patent Office 2,907,948
Patented Oct. 6, 1959

2,907,948

SAFETY ENGINE ANALYZER SYNCHRONIZER

Loren C. Sackett, Inglewood, Calif., assignor to Brooks Walker, San Francisco, Calif.

Application October 22, 1956, Serial No. 617,584

4 Claims. (Cl. 324—16)

This invention relates to means for synchronizing engine analyzers, adapted for the display of information concerning the operation of internal combustion engines, with the particular engine under study.

Such engine analyzers comprise, in general, sensing elements associated with each cylinder of the engine, these elements being adapted to give indications, in the form of electrical impulses or waves, of the various events, in the cycle of the operation of the engine, upon which its performance depends. These indications may either be as to the phase in the cycle of operation of each cylinder at which ignition occurs and whether the ignition system is functioning properly as to timing, spark intensity, duration, etc., or the epochs in the cycle at which the intake and exhaust valves open and close or at which various other events take place, such as detonation or prefiring of the charge of gas in the cylinder, the instant of injection of the fuel into the cylinder (where injection-type fuel systems are used), misfunctioning of valves, or the like. These latter indications are customarily given by a vibration-sensitive element, which is essentially a special type of microphone, associated with each cylinder.

The electrical waves developed by the sensing elements are applied to a cathode-ray tube that traces a curve indicative of the operation of the cylinder or cylinders under study. In the most generally useful type of display on a cathode-ray tube, the cathode-ray beam is swept across a luminescent display screen, deflected by a sawtooth wave synchronized with the engine operation. In accordance with the usual convention the sweep of the cathode-ray beam across the screen is horizontal and the indications of the sensitive elements are applied to deflect the beam vertically from its horizontal course, causing "pips" to appear along the trace at the various epochs of the engine cycle at which the events being studied appear.

If the study of the trace of the cathode-ray beam across the display screen is to yield the information desired, the position of the pips upon the trace must be correlated in some manner with the position of the piston within the particular cylinder that is under examination, this latter position depending, in turn, upon the angular rotation of the crankshaft of the engine from an arbitrarily selected datum point at the instant the indicated event occurs. In the four-stroke cycle engines that are customarily employed, the crankshaft rotates 720 degrees in each cycle of engine operation; accordingly, it is most convenient so to synchronize a sweep generator, that the sweep is initiated at a known datum point in the mechanical operation of the cylinder. The generator develops a sawtooth wave, so that the beam traverses the screen at a uniform rate and flys back to the starting point in a time period so short that it can be neglected in comparison with the period of one cycle of engine operation, or is at least of known duration and occurs at a portion of the engine cycle in which no critical event in engine operation normally occurs.

One conventional and generally accepted method of synchronizing the oscilloscope sweep with the engine cycle is to employ a sweep generator for deflecting the beam that is responsive to a triggering pulse, this pulse being effective to initiate flyback. One known means for deriving triggering pulses of this type is to use some form of coupling to the ignition circuit. This is simple and effective, but possesses the decided disadvantage that the epoch of the triggering pulse is to some degree indeterminate because of the use of varying degrees of spark advance at various engine speeds.

Because of the great reliability required of aircraft engines and of the fact that they are operated customarily for long periods under substantially their full rated load for continuous operation, analysis by engine analyzers is particularly valuable in the aircraft field, not only in the course of periodical tests and overhaul but also as a continuous check on engine operation in flight. It is becoming increasingly common to install the necessary sensing elements permanently on the various cylinders of aircraft engines and to connect them permanently to cathode-ray oscilloscopes mounted in the cockpit, where they can be observed by the pilot or flight engineer. By checking the display upon the oscilloscope at short intervals during flight an experienced observer can detect malfunctioning of an engine in its incipiency and either take measures calculated to correct the trouble developing or, if this is impossible, at least be prepared to cope with an emergency should one arise.

In modern commercial and military aircraft each engine is normally provided with a tachometer for indicating the revolutions per minute at which the engine is operating and this tachometer is driven by a polyphase electrical generator, mounted permanently upon the engine. In some cases the tachometer is so geared to the crankshaft that it develops one cycle per phase for each cycle of engine operation; i.e., one cycle per phase for each 720 degrees rotation of the crankshaft. In other instances the tachometer operates at crankshaft speed, giving one cycle per phase for every 360° of crankshaft rotation. The presence of a generator of either type offers an opportunity for synchronizing the analyzer sweep circuit; a single-phase wave can be derived from the three-phase tachometer generator output and from this there can be developed pulses occurring at definite phases of the single-phase wave, most conveniently by means of clipping and differentiating circuits that develop pulses each time the single-phase wave passes through zero. In the case of a tachometer operating at half crankshaft speed the indications of like events in the various cylinders appear along the oscillograph trace in the order in which the cylinders fire; if the tachometer operates at crankshaft speed the traces of two half-cycles of engine operation are superposed, but there is no confusion. The indications of events in the second half-cycle fall midway between those of the first, and their order of appearance along the trace is that of the angular position of the successive cylinders around the crankshaft, instead of their firing order. The superposed traces still represent 720° of crankshaft rotation.

There are numerous rather obvious methods of deriving single-phase waves from a three-phase output. It can be done by connecting across any two of the three output leads, or from any one of these leads to a neutral or ground, in case a grounded neutral, Y-connected system is used. For tachometer use the phase of the tachometer generator is unimportant, the important factors being voltage, frequency, and phase sequence. For engine analyzer use, however, it is necessary that the phase of the triggering pulses with respect to the crank angle, measured from the selected datum, be known to a high degree of certainty; an error of more than one degree with respect to the selected datum may be enough practically to vitiate the conclusions drawn from the engine analysis.

Accordingly, it is quite customary to modify the mounting of the tachometer generator when it is to be used for engine analyzer purposes. An adjustable sleeve is used to connect the generator to its drive shaft, mounted on the engine, in order to make the initial adjustment. The generator frame is provided with a number (usually three) of circumferentially arranged slots through which stud bolts pass, securing the generator frame to its mounting pad on the engine.

The final phase adjustment is then made by rotating the generator around its shaft within the limits permitted by the slots of the frame. This final adjustment can, in practice, only be made while the engine is running. To make it requires concurrent observation of the display oscilloscope and adjustment of the generator. Since in large aircraft the generator and the man who is setting it are invisible to an observer in the cockpit of the airplane, the final adjustment is a matter of very considerable difficulty and danger. It requires either two men in telephone communication or three men, one setting the generator position, one observing the oscilloscope and a third to relay messages between them. The generator is close to dangerous moving parts, including the most dangerous of all, the airplane propeller; in one commercial form of aircraft engine a mechanic setting the generator is within two feet of the whirling propeller. The engine is almost certainly hot, the generator mounting is difficult of access and the danger of its slipping slightly on its pad as the stud bolts are tightened, even after the correct position has been found, is very considerable.

The broad purpose of the present invention is to make the dangerous, time-consuming and expensive operation thus described completely unnecessary. Contributory to this broad purpose, among the objects of the invention are to provide means for deriving from a polyphase input, an output having any desired phase relation whatsoever with a reference phase of such input; to provide means whereby an observer can, while watching the oscilloscope of an engine analyzer, set the phase relationship of the triggering pulse that actuates the oscilloscope by himself, without disturbing the generator mount and without assistance; to provide means whereby the tachometer generator on an engine may be removed and replaced without regard to accurate phasing and any phase discrepancy between its initial setting and its setting after replacement can be corrected by a single operator in a few seconds time; to provide apparatus of the character described that weighs but a few ounces, that can be set to an accuracy exceeding greatly that possible by rotation of the generator field, that is constructed of standard and readily commercially available parts and that is therefore relatively inexpensive. Other objects and advantages will become apparent in the course of this specification.

The accompanying drawings illustrate a preferred form of the present invention that will next be described in detail. In these drawings:

Fig. 1 is a schematic diagram of the synchronizer of the present invention, conventional equipment supplied by the synchronizer being indicated in block form; and Fig. 2 is an illustration of one form of control panel adapted for operating the equipment schematically illustrated in Fig. 1.

In Fig. 1 the three-phase generator is indicated schematically by the reference character 1. Ordinarily this will be the tachometer generator permanently attached to the engine. It will be realized, however, that in case the engine analysis is conducted during an overhaul or in an initial engine test the generator 1 may be a separate generator used for the purpose and not permanently attached. The important point is that there is associated with the engine, for at least the period of the analysis, a source of polyphase current, driven synchronously with the operation of the engine and, in the case of a four-stroke cycle engine, operated at either one-half crankshaft speed or at crankshaft speed, this source not being a part of the apparatus included within the present invention. The generator 1 is conventionally shown as of the three-phase type, since this is the most economical and the most generally used, but any polyphase source of supply can be employed, the elements to be described in connection with each of the three phases being duplicated in each phase added.

The equipment included in the device of the invention is that enclosed within the broken lines 3. This equipment includes a set of polyphase input leads designated as $5_a$, $5_b$ and $5_c$. Two of these leads, $5_b$ and $5_c$, are shown as connecting to a reversing switch 7, by operation of which the order of the leads $5_b$ and $5_c$, as they connect to the device proper, may be reversed. This switch is not an essential feature of the device, but is convenient, particularly for use with an engine analyzer not permanently installed in connection with the engine, since it can be thrown up or down selectively to reverse the order of the generator phases B and C, either to take care of right or left hand directions of the engine rotation or to correct a possible misconnection of the generator leads, so that the operator of the apparatus can always make his settings in accordance with the same convention, without having to consider whether he should turn his controls to right or left in order to advance or delay the phase of the output wave, as the case may be.

The three-phase leads, with or without passing through the reversing switch 7, connect to a set of three, ganged, three-point switches $9_1$, $9_2$ and $9_3$. As shown, the lead $5_a$ connects to one point of each of the three switches, the lead from $5_b$ connects to three other points and the lead $5_c$ to the three remaining points of each switch. The switch arms of these switches are disposed so that when the arm of switch $9_1$ connects to phase A, switch $9_2$ connects to phase B and $9_3$ to phase C, the reversing switch 7 being assumed to be thrown down. The switch arms connect, respectively, to a set of transfer leads $11_1$, $11_2$ and $11_3$.

Three, ganged potentiometers $13_1$, $13_2$ and $13_3$ are connected so that their resistive elements connect across successive pairs of transfer leads, the resistor of potentiometer $13_1$ connecting from lead $11_1$ to $11_2$, and so in order, the resistor $13_3$ connecting from lead $11_3$ back to $11_1$. The movable contacts of the three potentiometers connect, respectively, to a set of output leads $15_1$, $15_2$ and $15_3$.

The potentiometers 13 are preferably of a precision, wire-wound type. The value of the resistors in each of these potentiometers may vary quite widely, in order to provide a suitable output impedance for the generator 1 and not impose so great a load upon it as to interfere with its performance as a drive for the tachometer. Illustratively, however, in one type of device that has been used in practice, each of the three potentiometers has a resistance of 5,000 ohms.

It is sometimes convenient to provide a Y network of resistors 17 with the neutral or common point grounded, connected to the three output leads. This is optional. It is desirable, however, where the engine analyzer equipment is so constructed that the trigger pulse is applied between a high potential lead and ground. If the trigger input is ungrounded, the potential for developing the triggering pulse can be taken off between any pair of leads 15.

The method of taking off a single-phase pulse in the case of a grounded system is illustrated in the block portion of the diagram of Fig. 1. The output wave across one of the resistors 17 and ground is increased in amplitude by an amplifier 19, if necessary, and thence supplied to a limiter 21 that clips the crest of the output sine waves and converts them to a succession of substantially rectangular waves. These then supply a differentiating network 23 that derives from the rectangular waves short pulses of alternating polarity. If desired, for eliminating the pulses of one polarity, a rectifier 25 may be interposed between the differentiating network and the sweep generator 27 that supplies the deflecting potentials for the oscilloscope of the engine analyzer.

In the case of an ungrounded system, or of a system in which one phase of the generator is grounded, the Y network can be omitted and a 1-to-1 isolation transformer connected across any two of the leads 15. One end of the secondary of such a transformer can be grounded without regard to the position of the ground in the generator circuit. Beyond the transformer the connections can be as shown. The use of an inexpensive single-phase transformer in this manner avoids any necessity for more expensive, three-phase isolation.

The controls for the apparatus can be mounted as indicated in the panel illustrated in Fig. 2. The switch 7 is shown near the top of the panel. A three-position knob 29 controls the switches 9, while the potentiometers 13 are controlled by a common, indexed knob 31 reading on a dial 33, all of these controls being mounted on a panel which need not exceed two inches on a side and can, by careful design, be made even smaller. The dial 33, in the case of the three-phase supply, is conveniently graduated to read in terms of crankshaft rotation, from zero to 240 degrees, although it may, of course, be graduated in terms of phase rotation, from zero to 120 degrees, or in completely arbitrary fashion.

The arrangement thus described has some advantages that may not be immediately apparent. The device is, in effect, a special form of resolver of the resistive type, and resolvers are known wherein resistive elements are employed comprising continuously wound rings with taps at equidistant points around the ring. A potentiometer of this latter type, provided with three pick-up arms, insulated from each other and also equidistantly spaced, will provide a three-phase output of completely adjustable phase. Accurate three-phase, potentiometer-type resolvers, however, are quite expensive and are much more bulky than devices of equal accuracy made in accordance with the present invention. Precision single-phase potentiometers are made in quantity and are relatively inexpensive. Such potentiometers are designed so that they can be ganged, as is required for the present purpose. They can be obtained so manufactured that the movable contact, in rotating from end-to-end of the potentiometer, sweeps through a range of 300 degrees or more or even a complete circle. Accordingly, with the present device, the scale is expanded nearly threefold, so that much more accurate settings are obtainable, without complication of stepdown gearing to obtain a fine adjustment, than with a single three-phase potentiometer. The switches 9 serve to give a coarse setting, dividing the range of crankshaft rotation per cycle into thirds, and the fine setting within each third of the cycle is accomplished with the potentiometers.

If the instrument is to be permanently installed the pointer can be set, e.g., by means of a set screw 35, so that it reads zero on the scale at some selected datum, e.g., at top dead center of the master cylinder of a radial aircraft engine at the instant of the triggering pulse to the sweep generator. If this is done the sweep generator can be triggered at any desired crankshaft angle with reference to the datum point directly from the dial and switch setting.

If the device is used as an auxiliary to be added to an analyzer already installed both the direct-reading feature and the extreme accuracy of the potentiometer calibration may be superfluous, and ordinary, relatively low-precision potentiometers may be used. The most common fault with potentiometers of the latter character is that the contact arm fails to contact the extreme ends of the resistors. Furthermore, potentiometers using composition, rather than wire-wound resistors, may not be completely uniform in calibration. The lack of uniformity is ordinarily slight, however.

If potentiometers of this character are used, i.e., potentiometers where the extreme ends cannot be reached by the contact arms, there will be slight gaps in the 360 degrees of phase rotation that cannot be reached to produce a triggering pulse across a particular pair of leads. Thus, in the arrangement shown, if non-precision potentiometers are used wherein the variable contact does not reach the exact ends of the windings, there will be gaps corresponding to a few degrees on each side of the maximum of the three phases A, B and C to ground, and therefore between the lead $15_2$ and ground. Even this, however, does not prevent an accurate setting being obtained, since the voltage between leads $15_1$ and $15_2$ or between leads $15_2$ and $15_3$ are each displaced 60 degrees from the voltage between lead $15_2$ and ground. If an exact setting cannot be obtained between one pair of leads or between a given lead and ground it can always be obtained by switching the connection. Similarly, slight inequalities in winding resistance distort the scale readings slightly but do not prevent an accurate setting. The safety features of the device are therefore preserved even though its precision features are sacrificed to economy.

Ganged switches 9, such as are used to select the major arcs of crankshaft rotation, are mass produced for use in radio equipment and are economical and positive in action.

The invention therefore has a wide field of usefulness, either as a precision instrument of low cost and light weight or as a safety device, of still lower cost, that is still capable of setting the relative phase of an analyzer synchronizing pulse just as accurately as the precision type but without the feature of being able to read the angle at which it is set to the same degree of accuracy.

In the non-precision type the operator may not care to know the direction of rotation of the field, so long as the synchronizing pulse is obtained at the proper point. Under these circumstances the switch 7 is omitted.

Like most passive networks, the input and output terminals of the device as a whole or of the ganged switches may be interchanged without changing either its transfer constant or its functioning. Various modifications of the invention in addition to those that have been specifically described will be apparent to those skilled in the art. All intended limitations on the scope of the invention are set forth in the claims that follow, it being noted, however, that the use of the terms "input" and "output" with reference to the leads are not intended as such limitations but merely as convenient designations to differentiate between the two sets of leads.

What is claimed is as follows:

1. A safety synchronizer for use with engine analyzers comprising a set of polyphase input leads, a plurality of ganged selector switches, arranged to connect said input leads selectively to a like set of transfer leads, a plurality of ganged potentiometers equal in number to the phases of said input leads and each comprising a resistor and a contact movable therealong, said resistors connecting respectively between successive pairs of said transfer leads, and a set of polyphase output leads connected to the movable contacts of said potentiometers.

2. A safety synchronizer for use with engine analyzers to derive from a three-phase tachometer generator, driven by an engine to be analyzed, synchronizing pulses for triggering the sweep circuit of an analyzer oscilloscope or the like, comprising a set of three input leads adapted for connection across the three phases of said tachometer generator, a group of three ganged three-point switches interconnecting said input leads selectively to any of a set of three transfer leads, three ganged potentiometers each comprising a resistor and a contactor movable therealong, each of said resistors being connected across a different pair of said transfer leads, and a set of three output leads connected respectively to the movable contacts of said potentiometers.

3. A synchronizer as defined in claim 2 including switching means for interchanging the connections of one pair of leads in one of said sets to reverse the order of phase rotation between said input leads and said output leads.

4. A synchronizer as defined in claim 2 including a scale and index mechanically connected to the movable contacts of said ganged potentiometers said scale being calibrated to indicate the phase rotation between said input and output leads.

References Cited in the file of this patent

UNITED STATES PATENTS

| 2,241,615 | Plebanski | May 13, 1941 |
| 2,648,811 | Sohon et al. | Aug. 11, 1953 |
| 2,676,299 | Leavitt | Apr. 20, 1954 |

FOREIGN PATENTS

| 156,352 | Australia | May 5, 1954 |

OTHER REFERENCES

Jupe: "Electronic Engineering," April 1948, pp. 130–131.